US005893093A

United States Patent [19]
Wills

[11] Patent Number: 5,893,093
[45] Date of Patent: Apr. 6, 1999

[54] INFORMATION SEARCH AND RETRIEVAL WITH GEOGRAPHICAL COORDINATES

[75] Inventor: Kenneth Wills, Grapevine, Tex.

[73] Assignee: The Sabre Group, Inc., Fort Worth, Tex.

[21] Appl. No.: 887,471

[22] Filed: Jul. 2, 1997

[51] Int. Cl.[6] .................................................. G06F 17/30
[52] U.S. Cl. ............................... 707/5; 707/4; 707/530; 345/438; 705/22
[58] Field of Search .............................. 707/4, 3, 5, 103, 707/513, 104, 6, 530, 531; 364/444, 443; 342/451; 345/438; 705/22

[56] References Cited

U.S. PATENT DOCUMENTS

| | | | |
|---|---|---|---|
| 5,231,584 | 7/1993 | Nimura et al. | 364/444 |
| 5,329,108 | 7/1994 | Lamoure | 235/494 |
| 5,471,392 | 11/1995 | Yamashita | 364/443 |
| 5,475,598 | 12/1995 | Fushimi et al. | 364/444 |
| 5,543,788 | 8/1996 | Mikuni | 340/990 |
| 5,544,061 | 8/1996 | Morimoto et al. | 364/444 |
| 5,559,707 | 9/1996 | DeLorme et al. | 364/443 |
| 5,596,500 | 1/1997 | Sprague et al. | 364/449 |
| 5,630,072 | 5/1997 | Dobbins | 705/22 |
| 5,724,571 | 3/1998 | Woods | 707/5 |
| 5,742,297 | 4/1998 | Logan | 345/438 |

*Primary Examiner*—Wayne Amsbury
*Assistant Examiner*—Thu-Thao Havan
*Attorney, Agent, or Firm*—Finnegan, Henderson, Farabow, Garrett, & Dunner, LLP

[57] ABSTRACT

An information search and retrieval process using geographical coordinates. An index of coordinates is built for a plurality of text based references, resources or sites, each having a set of said coordinates. A user inquiry is accepted containing a text reference. The text reference specified in the user inquiry is converted to a set of coordinates. A search is thereafter conducted against the index of coordinates based on the converted coordinates of the user inquiry reference. All information retrieved from the search is returned in a text based format.

16 Claims, 10 Drawing Sheets

COMPONENT 1 (CONTINUED)

6 ARE THERE DUPLICATE PLACE NAMES IN THE REPORT ?
FOR EXAMPLE, THE INDEX MAY CONTAIN PORTLAND (MAINE), PORTLAND (OREGON) AND PORTLAND (VICTORIA).
— NO → (loop back)
— YES ↓

7 IS ONE OF THESE DUPLICATE PLACE NAMES THE CORRECT ONE ?
— NO → (loop back)
— YES ↓

8 SELECT THE ITEM FROM THE REPORT WHICH CORRESPONDS TO THE PLACE NAME IN *SOURCE DOCUMENT*, AND APPLY ITS DISTINGUISHING IDENTIFIER TO THE PLACE NAME IN *SOURCE DOCUMENT*.
FOR EXAMPLE, APPLY THE PORTLAND (MAINE) IDENTIFIER TO THE PLACE NAME PORTLAND IN *SOURCE DOCUMENT*.

9 IF NONE OF THEM IS CORRECT, CHANGE MARK A TO MARK B IN *SOURCE DOCUMENT*.

10 ADD AN ENTRY TO *GEOGRAPHICAL INDEX* FOR EACH PLACE NAME IN THE *SOURCE DOCUMENT* MARKED WITH MARK B.

11 EXECUTE PROGRAM TO UPDATE *DOCUMENT INDEX* WITH ENTRIES WHICH INCLUDE GEOGRAPHICAL COORDINATES AND POINTERS TO *SOURCE DOCUMENT*.

Fig. 9

INFORMATION SEARCH AND RETRIEVAL WITH GEOGRAPHICAL COORDINATES

BACKGROUND OF THE INVENTION

1. Field of the Invention.

The present invention is directed to an information search and retrieval system which will both search and provide return retrieval information in a text based format via the indexing of data through a geographical coordinate system.

2. Prior Art.

Computerized searching for relevant, specific information in a large body of unstructured text is necessarily a less efficient process than searching for such information in a structured file or database. One contributor to such search inefficiency is the fact that a word in the English language (or any other language) may carry several unrelated meanings. The context or expression within which any word occurs usually makes it clear to the average reader which meaning, among several alternatives, is appropriate. For example, it may not even occur to the reader of a paragraph dealing with wood shaping tools such as augers, chisels and planes, that the word planes could mean aircraft.

Another, perhaps greater difficulty for computerized text search and retrieval is that search arguments and responses often contain proper nouns. Whereas language dictionaries may help resolve ambiguities of common nouns, they typically provide little or no help in disambiguating proper nouns (names). Book publishers typically employ editors and make them responsible for compiling indexes to scholarly publications. Out of necessity, these editors must be sufficiently educated in the subject of the publication in order to resolve ambiguous names included in the index. For example, a book on British history might contain several references to *Churchill*. The compiler of the index would then be obligated to create a separate entry for each "distinct" individual named *Churchill*, and further include reference pointers to all appropriate pages containing information relating to such individual entries.

An even more pronounced difficulty is realized in the instance of place names. A compiler of an index to a book might discriminate between multiple locations sharing the same name, by adding distinguishing attributes such as county, state or country. A reader of a book about the American Mid-West seeking information about "Springfield" would likely discover that there are cities of that name in Illinois, Missouri and Ohio, thanks to the efforts of the index compiler. However, a search for information about Springfield in a loosely defined body of text or a database such as the World Wide Web has no such support from an index. Using any one of the currently available Internet search tools, the user is faced with a serious deficiency, as a search for Springfield will retrieve all documents from the World Wide Web containing that proper noun, irrespective of the city to which the "searcher" meaningfully refers. The searcher or user might then constrain the search somewhat by using additional search arguments such as "'Springfield MO" OR "Springfield Missouri"'. The retrieved, revised results would then relate to the intended Springfield. However, in this instance the search would have then ignored all other documents containing the simple unqualified name Springfield—even if such references were directed towards the intended Springfield. Typically, the scope of any document sets the context for the use of place names within it, and so a listing of, say, all the travel agents in Missouri would use their city names without any State qualification.

The problem becomes even more significant should the user wish to retrieve documents containing information about places within, and restricted to, a specific area. For example, if the user wants to learn about Bed & Breakfast establishments in California's Napa Valley, many highly relevant documents might not contain the phrase "Napa Valley". Instead, they might very well contain and refer to a city within California's Napa Valley. 'St. Helena,' serves as an example of such a city. In today's "unlimited access to unlimited information" environment, a competent search engine must be able to discriminate and comprehend the geographical limits of any given area, and retrieve all relevant documents satisfying search arguments within that area. In this example, a competent search engine would find and return all documents describing Bed and Breakfast establishments in Napa Valley's Saint Helena, but ignore any such documents relating to the island of St. Helena in the South Atlantic.

All of these problems are exacerbated by the growth of computer networks including the World Wide Web which is a large network of networks, all interconnected.

The present invention provides a means of resolving all existing search and retrieval deficiencies noted above by means of enhanced database index processing.

Though various navigation systems have been used in the past (for example, see Nimura U.S. Pat. No. 5,231,584) they are not capable of indexing documents from a variety of sources in a coordinates system for later reference and retrieval.

Also in the past, various digital mapping systems have been provided, which may include a location index. Lamoure (U.S. Pat. No. 5,329,108) shows one such example. Nevertheless, none of the prior art mapping systems provide an indexing system for searching and retrieval of multiple documents based on coordinates indexing.

DETAILED DESCRIPTION OF THE PREFERRED EMBODIMENTS

The following definitions apply throughout the application.

Source Document 100—a text based document which may be indexed for subsequent retrieval. Examples of documents would be a document located in a computer file or an Internet based document such as that found on the World Wide Web.

Geographical Index 200—a computer file or database of place names with their geographical coordinates such as latitude and longitude and other identifying characteristics.

Document Index 300—a computer file or database of terms found in Source Documents and the geographical coordinates of place names found in source documents with pointers to the Source Documents containing them.

Referring to the drawings in detail, FIGS. 1 through 4 are diagrams showing four process components of the invention while FIGS. 5 through 8 illustrate a step by step chart of the four process components.

Figure 5A:
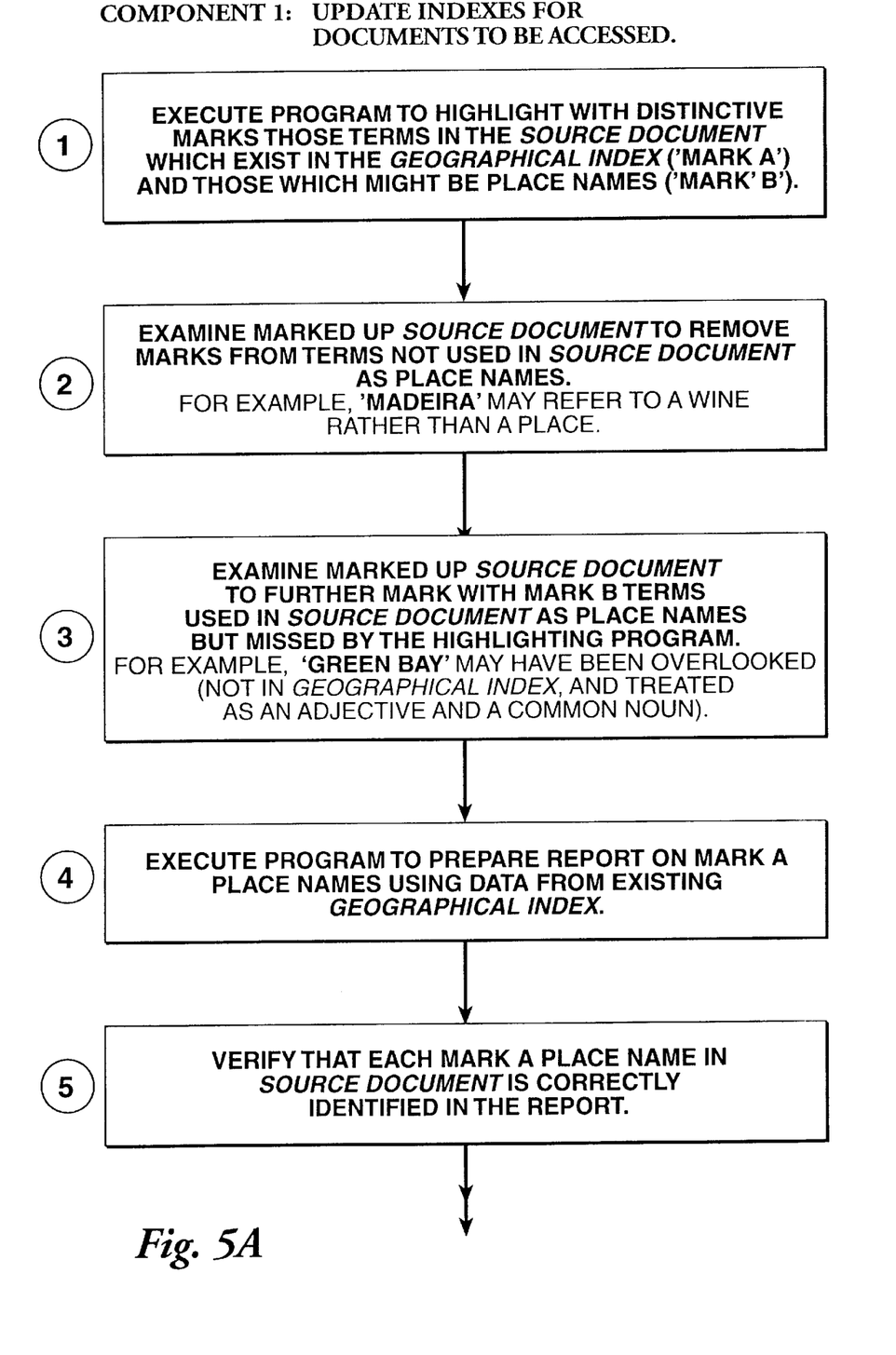
FIG. 5 is a logic flow diagram of the invention's document indexing component.
Figure 5B:
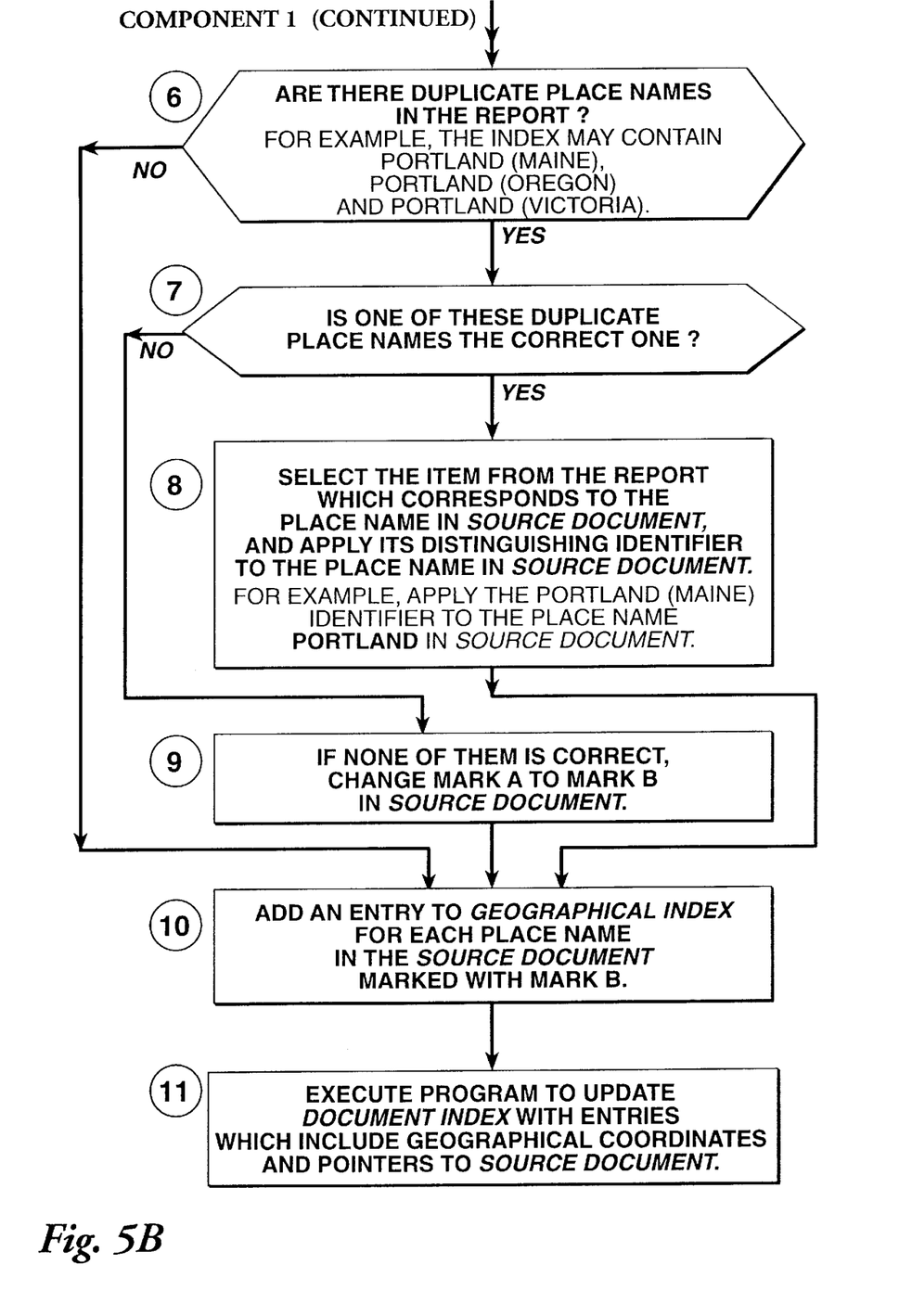

Process Component 1 applies to boxes 1–11 of FIGS. 5A and 5B.

Figure 6:
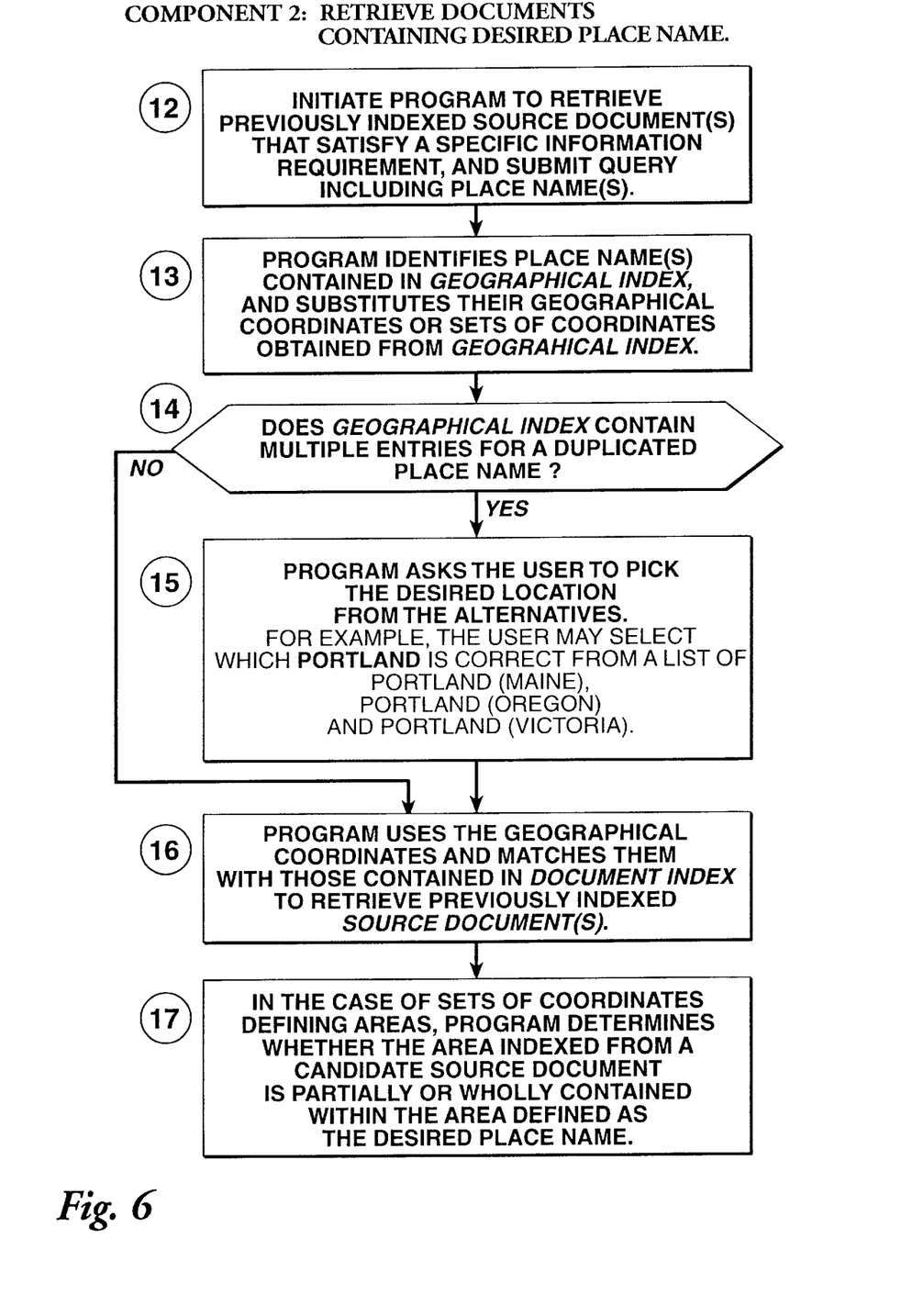
FIG. 6 is a logic flow diagram of the invention's document retrieval component.

Process Component 2 applies to boxes 12–17 of FIG. 6.

Figure 7:
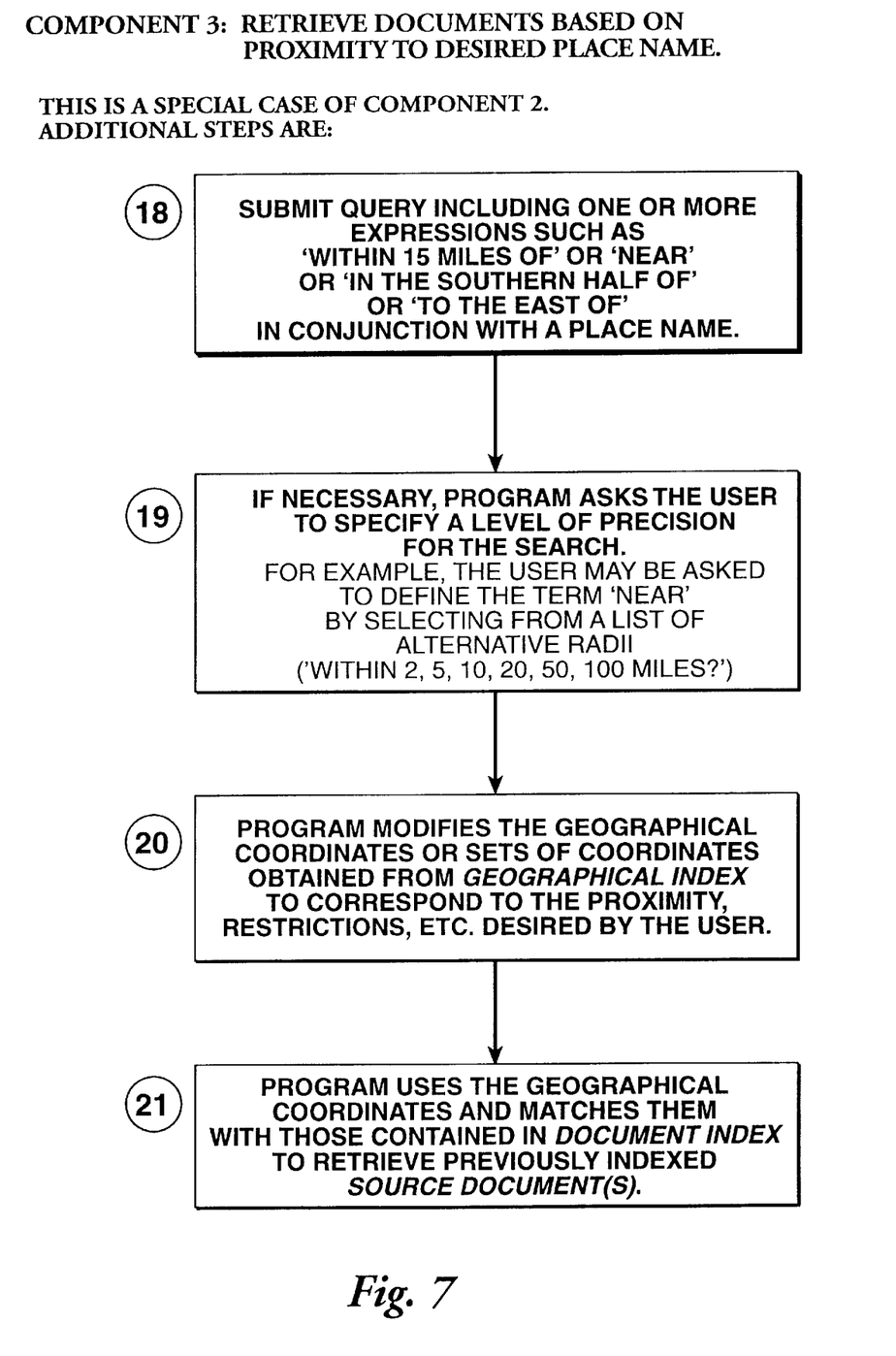
FIG. 7 is a logic flow diagram of the invention's "proximity based" document retrieval component.

Process Component 3 applies to boxes 18–21 of FIG. 7.

Figure 8:
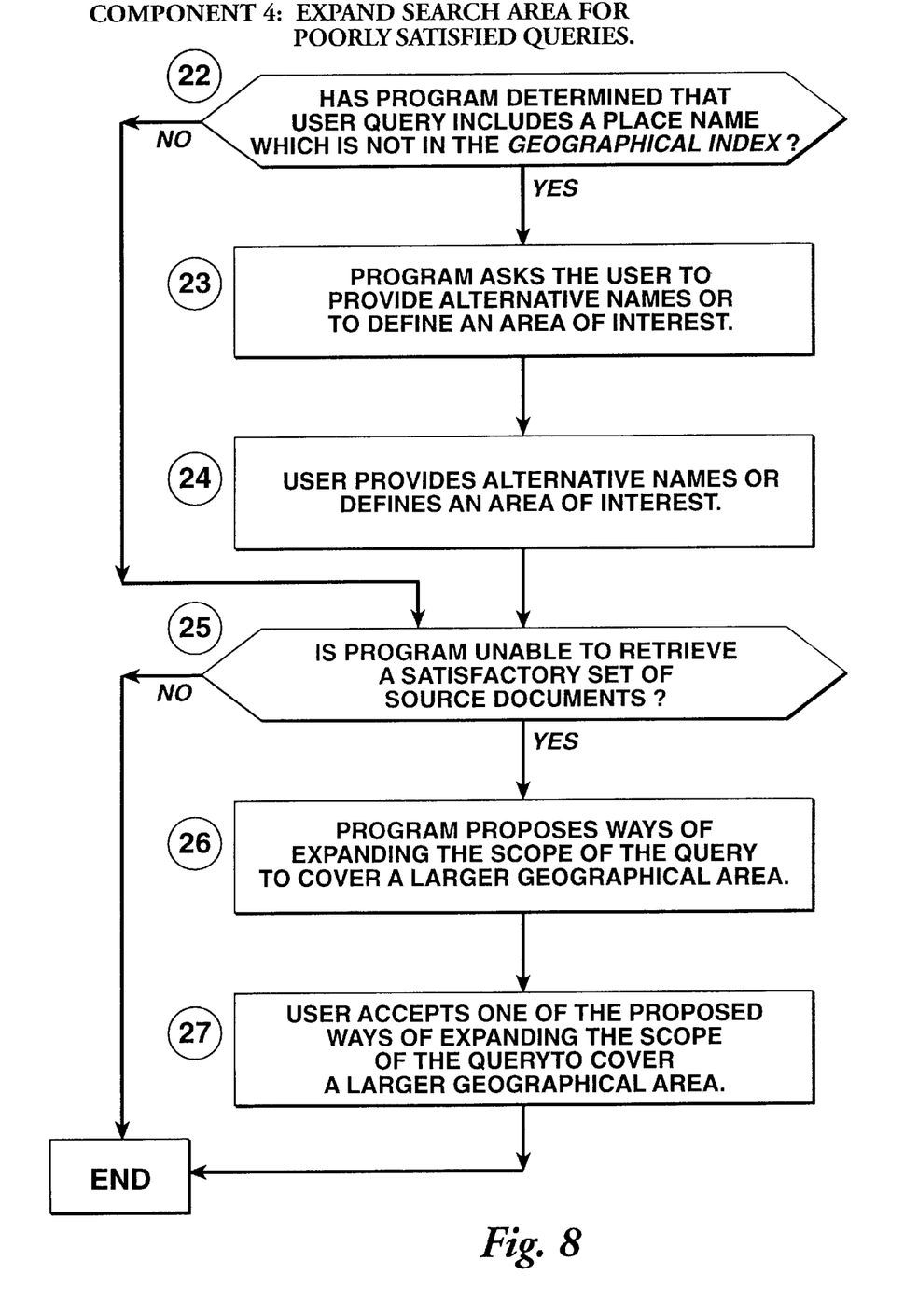
FIG. 8 is a logic flow diagram of the invention's search area expansion component.

Process Component 4 applies to boxes 22–27 of FIG. 8.

Process Component 1: Update Indexes for Documents to be Accessed

Figure 1:
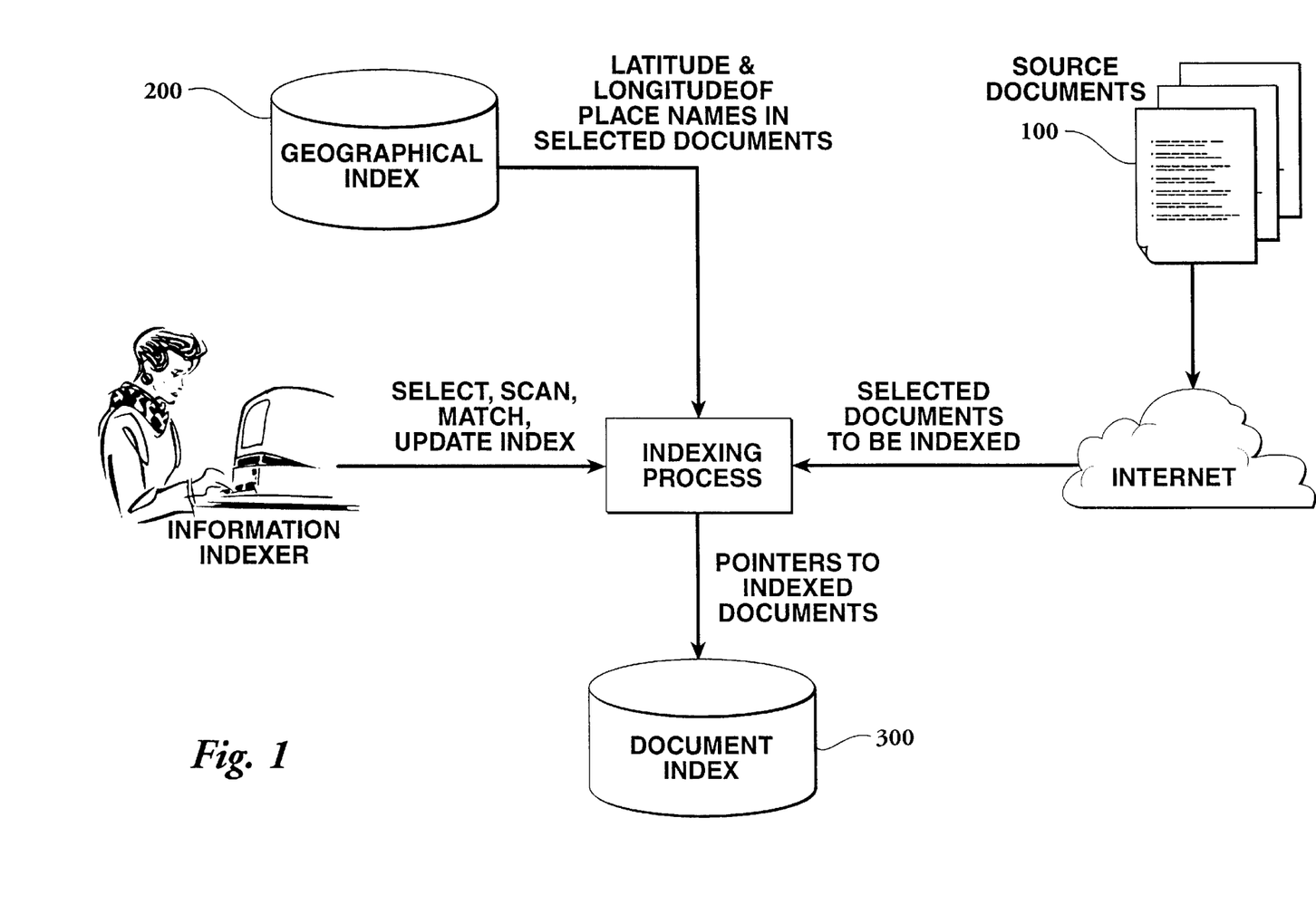
FIG. 1 is a diagram illustrating the document indexing component of the information search and retrieval with geographical coordinates invention.

As seen in FIG. 1, the purpose of the initial process component is to scan Source Documents (see definitions) and create index entries for all geographical terms found in them, so that subsequent searches for the same geographical area(s) will be able to find the relevant Source Documents. This process need be executed once only for each Source Document. The index entries are placed in a Document Index (see definitions), which may be a discrete index or physically form a subset of some other index. If a similar entry already exists in the Document Index, that entry is updated to point additionally to the new Source Document.

It is assumed that this process has access to the Geographical Index (see definitions), which has originally been constructed from an electronic gazetteer, that is to say, a file of place names with their distinguishing attributes and geographical coordinates such as latitude and longitude. The Geographical Index may also be a discrete index or form part of a larger file or database. Note that the Geographical Index is organized by place names, but the Document Index is organized by sets of geographical coordinates.

The geographical coordinates in the present embodiment are latitude and longitude although other coordinate systems are possible.

The user of the initial process may be a provider of a service to the users of the second process components to be described. Without the completion of this process component for each Source Document, the users of process component 2 will be unable to retrieve relevant Source Documents.

The process component as illustrated in FIG. 1 and set forth in flow chart form in FIGS. 5A and 5B can be envisaged as follows, although this is not the only way in which it might be embodied. The user executes this process component by running a specially written program or programs on a computer having a central processing unit that has access to (a) Source Documents 100 to be indexed, (b) the Geographical Index 200, and (c) the Document Index 300. By selecting a Source Document (for example, from a list or menu of non-indexed Source Documents), the user causes its contents to be displayed on the computer screen. The progress of the steps within this process component can be seen graphically in the way the contents are represented. This is assumed in the paragraphs below. The process component description assumes that the program and the user will each pass several times through a given Source Document. In practice, some process steps could be combined to reduce the number of passes.

After the user has selected the Source Document to be indexed, the program checks to see whether each word or phrase within it already exists in the Geographical Index. If it does, the depiction of that word or phrase on the screen is highlighted with a yellow background to indicate a first category ('Mark A'). The program also uses some logic to determine whether other nouns or noun phrases might be place names, even though they do not yet exist in the Geographical Index. It highlights these with a blue background to indicate a second category ('Mark B'). Mark B indicates that a new entry may have to be made in the Geographical Index 200.

The user's intent is to confirm that all words or phrases highlighted have been correctly recognized by the program as place names. The program will assist by guiding the user from each highlight to the next. At each one, the user indicates by a mouse click or a keystroke whether the highlight is correct or not. For example, the program may have highlighted 'Bikini' and the user may determine that in its context this word refers to a garment. By indicating that the program is not correct, the user causes the highlighting to be turned off.

The user's intent is to find any place names in the Source Document that have been missed by the program. The user reads through the text, and selects any non-highlighted word or phrase that should be treated as a place name (for subsequent entry in the Geographical Index). The user causes the selected term to be highlighted with a blue background ('Mark B').

The program now examines each term in the Source Document highlighted with a yellow background ('Mark A'), one at a time. In a separate window or box on the screen, it displays the corresponding term and the associated distinguishing attributes and geographical coordinates retrieved from the Geographical Index. There may be more than one entry in the Geographical Index corresponding to the same term, in which case they are all displayed in the same separate window or box.

If only one entry exists in the Geographical Index for the term highlighted in the Source Document 100, the user compares it with the term retrieved from the Geographical Index 200. If they correspond correctly, the user indicates that the reference is good. Although it now removes the highlight, the program remembers for step 11 that this entry will be updated in the Document Index to point to this Source Document 100. The user passes on to the next Mark A in the Source Document.

In the event that multiple entries for the same term have been retrieved from the Geographical Index, the user has more work to do (see steps 7–9 in FIG. 5B).

In this event, the first decision the user has to make is whether any one of the multiple entries displayed in the separate window or box is the one that corresponds to the highlighted term in the Source Document. If it is, the user may make a mouse click on the correct entry, or else, if the multiple entries are numbered, enter that number on the keyboard. As in step 5, the highlight disappears, but the program still has to remember the user's action so that it can execute step 11.

If all of the multiple entries displayed in the separate window or box are incorrect, this means that the Geographical Index does not yet contain an entry for the place whose name has been highlighted in the Source Document. At this stage, the highlight is yellow (Mark A), because the program found at least one entry of the same term in the Geographical Index, but the user will need to create a new entry in step 10. The action to be taken in this step is to change the highlight from yellow to blue (Mark B). [Note: this is also the action to be taken in step 5 if the single entry displayed from the Geographical Index was incorrect].

At this stage, all yellow highlights (Mark A) have been cleared from the displayed Source Document, either in step 5 or 8, or by changing to blue (Mark B). Each instance of a blue highlight (Mark B) now indicates that an entry needs to be added to the Geographical Index. The user obtains the distinguishing attributes and geographical coordinates such as latitude and longitude that need to be included in the entry, and enters these via the keyboard.

If the same term highlighted with Mark B occurs multiple times in the Source Document, the user will still need to confirm that the same place is referred to each time. Accordingly, once the entry has been added to the Geographical Index, the remaining instances of the same term in the Source Document will be converted back to Mark A, and step 5 etc. will be repeated for each such instance.

Finally, the program updates all the correct corresponding entries in the Document Index with pointers to the current Source Document, so that subsequent searches for the place names it contains will be able to retrieve this document. The organization of the entries in the Document Index is by the geographical coordinates found in the Geographical Index.

Process Component 2: Identification of Documents Containing Desired Place Name.

Figure 2:
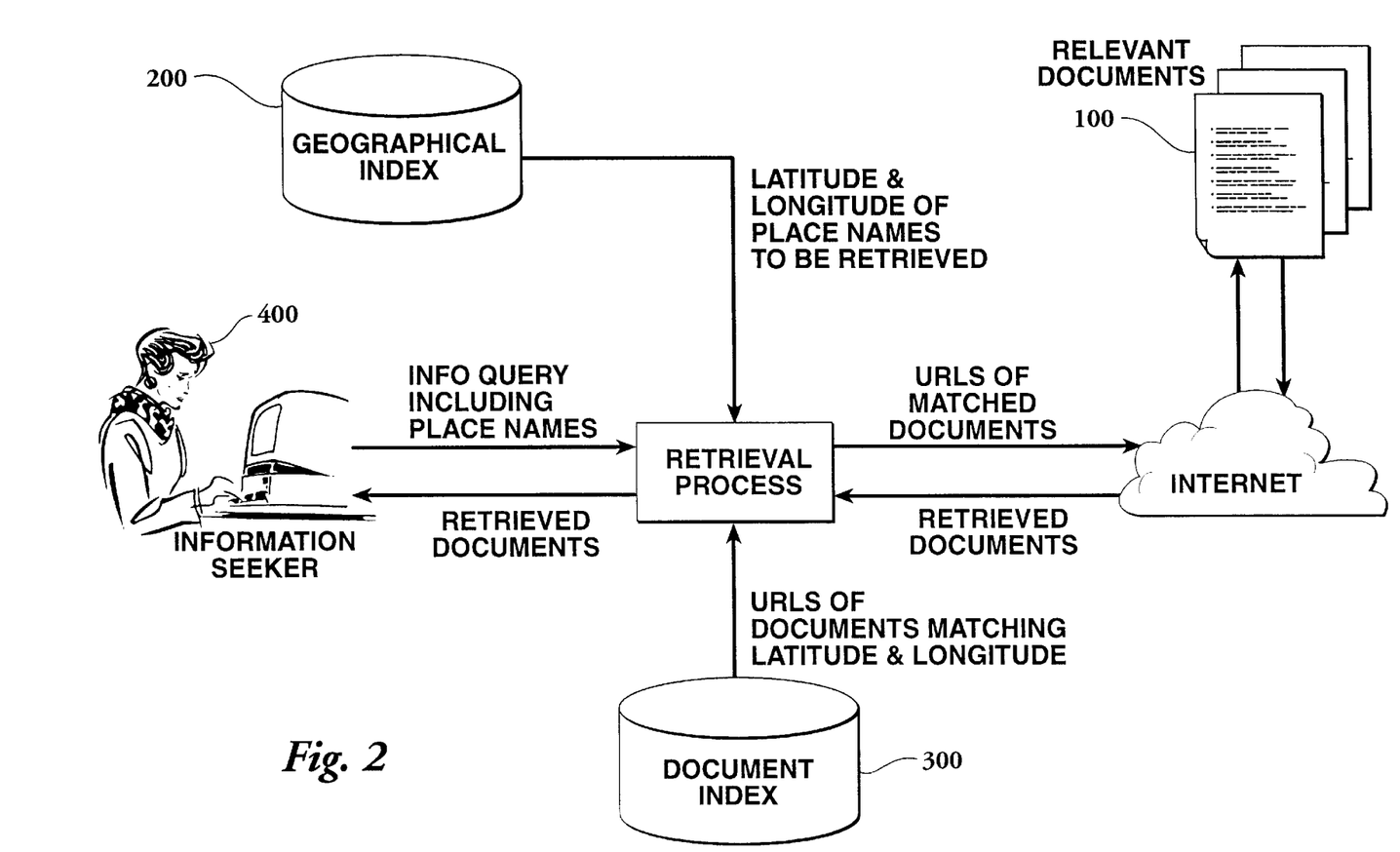
FIG. 2 is a diagram illustrating the document retrieval component of the subject invention.

The second process component of the invention is illustrated in the diagram of FIG. 2 and is set forth in flow chart form in FIG. 6. The user of this process may be different from the user of the first process component, but depends on the completion of process component 1 for all Source Documents that are to be retrievable. The program or programs used in this process component may be purpose designed, or may take the form of modifications to other search program(s). The program may give the user the capability of specifying a complex search argument such as 'I want information about all Chinese restaurants in San Francisco.' It is assumed that the some of the Source Documents indexed in the first process are likely to contain the desired information.

FIG. 6 illustrates a flow chart of the second process component. The user 400 is interested in a specific geographical place or area, and wishes to retrieve documents that relate to it in some way. The user 400 keys or selects a place name as part of the search argument as input to the search program, and submits an inquiry. The search program does not look for the existence of the specified place names in the Source Documents. Instead, it obtains the geographical coordinates of those place names from the Geographical Index.

If the desired place name refers to more than one place, as 'Paris' could be in France or in Texas, the Geographical Index will have multiple entries for that place name. In that case, before the search for relevant Source Documents can be made, the user is presented with a selection list from which to pick the desired place. The distinguishing attributes, such as State and Country are shown in the selection list, together with a graphic representation of the geographical coordinates of each entry. From these, the user can indicate to the program the correct one to use in the search.

The program uses the geographical coordinates obtained in the previous steps to search for the correct coordinates entry in the Document Index 300. It then follows the pointers recorded in the Document Index to the Source Documents that have been indexed to that entry, and retrieves the location of the relevant Source Documents for the user.

An area or region may also be searched. An area or region is defined by a series of geographical coordinate sets which describe its boundary. In a simple case, such as the State of Utah, four sets of coordinates would indicate the four corners of the State. An irregular shape can be defined by a longer series of sets. If the user has submitted a query for information about Utah, the program will retrieve all entries from the Document Index whose coordinates equate to or lie within those of Utah. The technique for determining this is known to be part of the prior art, and is not claimed to form part of this invention.

Process Component 3: Locate and Identify Documents Based on Proximity to Desired Place Name.

Figure 3:
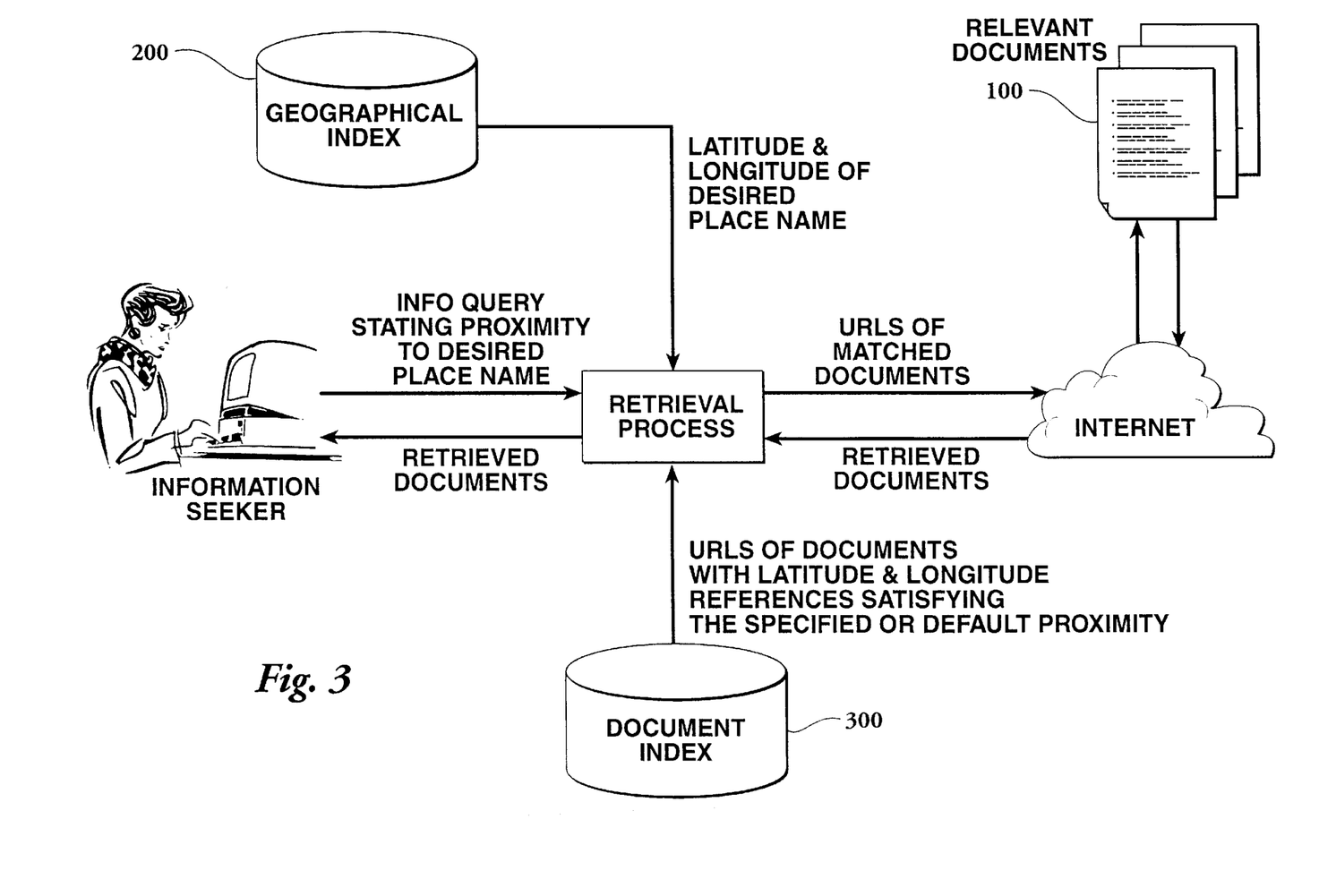
FIG. 3 is a diagram illustrating the "proximity based" document retrieval component of the subject invention.

The third process component is illustrated in the diagram in FIG. 3. This is an additional, optional feature of the invention with the step by step process shown in FIG. 7.

The third process component may be initiated by the user. Alternatively, the program may be initiated as a default if no responses are found in the second process.

It is assumed that this process component will work in conjunction with a natural language search engine such as Verity Search'97™, or a similar tool that can interpret the phrases entered by the user to specify proximity. A typical query might be: 'I want to know about Italian restaurants within 5 miles of Niagara Falls.' A more straightforward alternative would be to provide a list of canned phrases and distances in the user interface computer screen, from which the user would simply select the appropriate ones for the search.

The query is similar to the one submitted in step 12, except for the inclusion of a proximity specification. A number of expressions can be used to specify various kinds of proximity. Similarly, a number of options are available for qualifying the acceptable distance parameter to be used in the search. For example, the program may ask the user to enter a radius in miles or kilometers, or to pick from a preset selection of suitable radii. If the user does not qualify the distance, the program may default to a standard distance such as 10 kilometers, but a more sophisticated version would vary the standard according to the type of location specified. For example, 'hotels near the Empire State Building' should default to a lesser radius than 'hotels near Yellowstone National Park.'

The program will obtain the geographical coordinates as in step 16, and will modify them according to the specified/qualified proximity into a form such as a mathematical shape or formula which it can use to determine a match with the coordinates stored in the Document Index.

One type of proximity specification which requires special treatment takes the form of 'between x and y,' as for example 'motels between Flagstaff and Phoenix.' The program will construct a shape such as a rhombus. Two opposite points of the rhombus correspond to the coordinates of Flagstaff and Phoenix, and the other two opposite points of the rhombus are set apart from each other by a calculated distance such as the square root of the distance between Flagstaff and Phoenix.

Finding a match in the Document Index 300 includes determining those points of interest which lie within whatever shape may be defined in steps 19 and 20. The resulting matches are used to identify the location of the Source Documents 100 to which they point.

Process Component 4: Expand Search Area for Poorly Satisfied Queries.

Figure 4A:
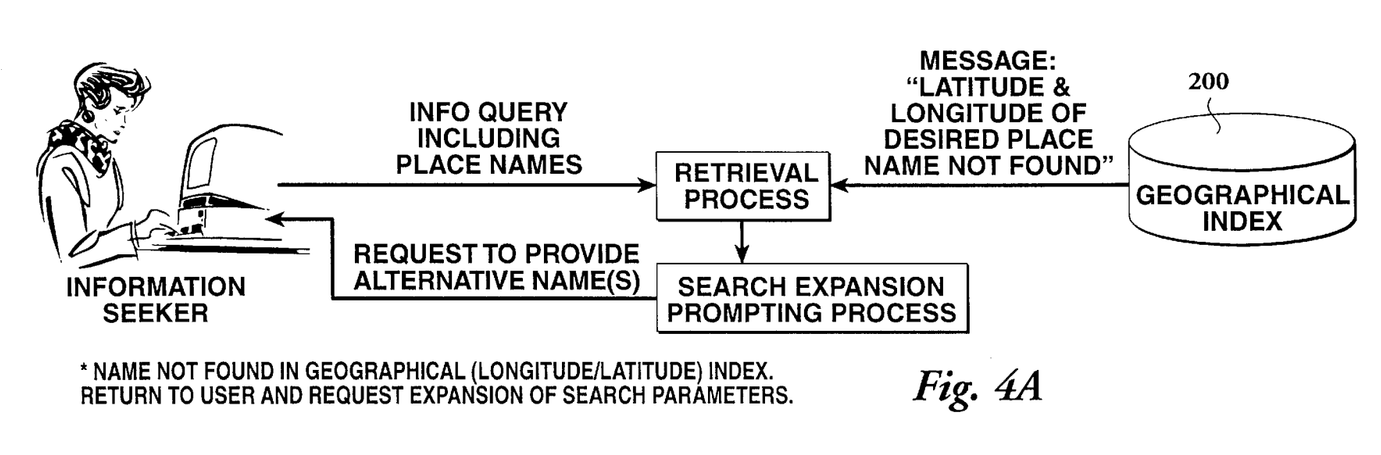
FIG. 4 is a diagram illustrating search argument expansion components of the subject invention.
Figure 4B:
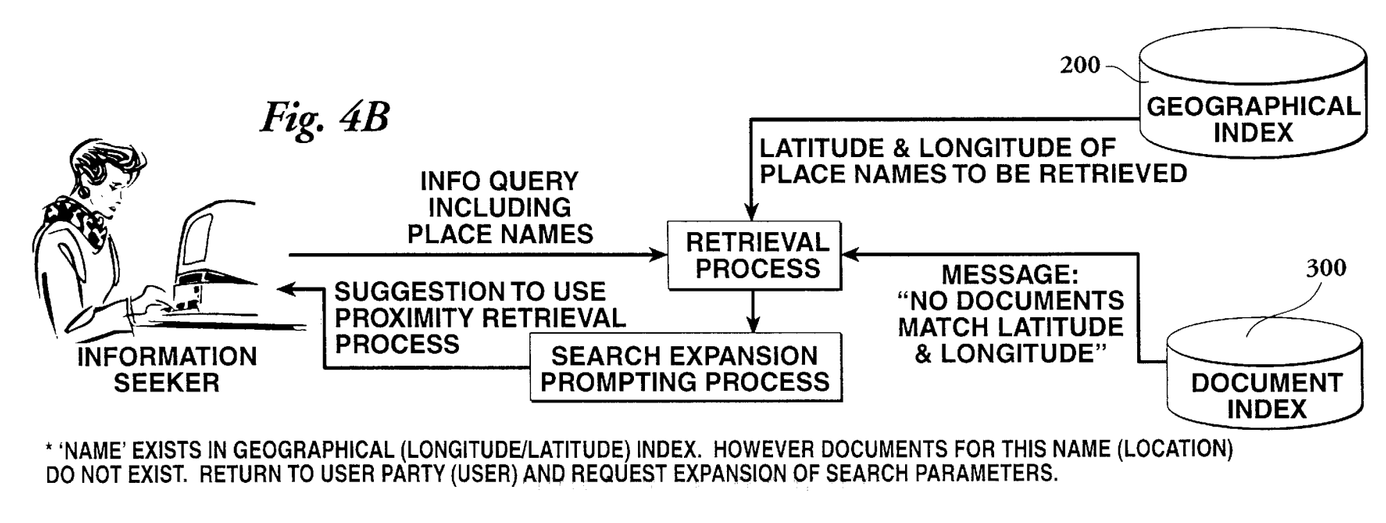

A fourth additional option process component is shown in FIGS. 4A and 4B and is set forth in flow chart form in FIG. 8. The fourth process component deals with steps to be taken at the end of process components 2 and 3 in the event that the search is unable to retrieve sufficient Source Documents 100 to satisfy the user. This problem may arise from too narrow geographical criteria. However, if the user had asked the program to find information about volcanoes in New York, the appropriate action is not simply to expand the search area.

The assumption behind step 22 is that the program, with help from the user, can determine that there is a place name in the user's query that has not been included in the Geographical Index. This would be the case, for example, if the user had misspelled the place name. Various approaches to this function are possible, and lie outside the scope of the current patent.

Various types of prompting are possible: Suppose that the user had tried without success to search for documents relating to 'San Matteo.' The program would indicate that no such place existed in its index. The user might then recognize the misspelling of the name and enter 'San Mateo.' If not, the user might change the request to 'San Francisco Bay Area.'

In another case, indicated in step 25 of FIG. 8, the place name specified was valid, but there were not enough Source Documents relating to it. Again, various types of prompting are possible. Suppose that the user had tried without success to search for documents relating to Boca Chica. At the prompting of the program, the user could modify the search to 'within 50 miles of Key West,' 'in the Florida Keys' or 'between Key West and Key Largo.'

Figure 9:
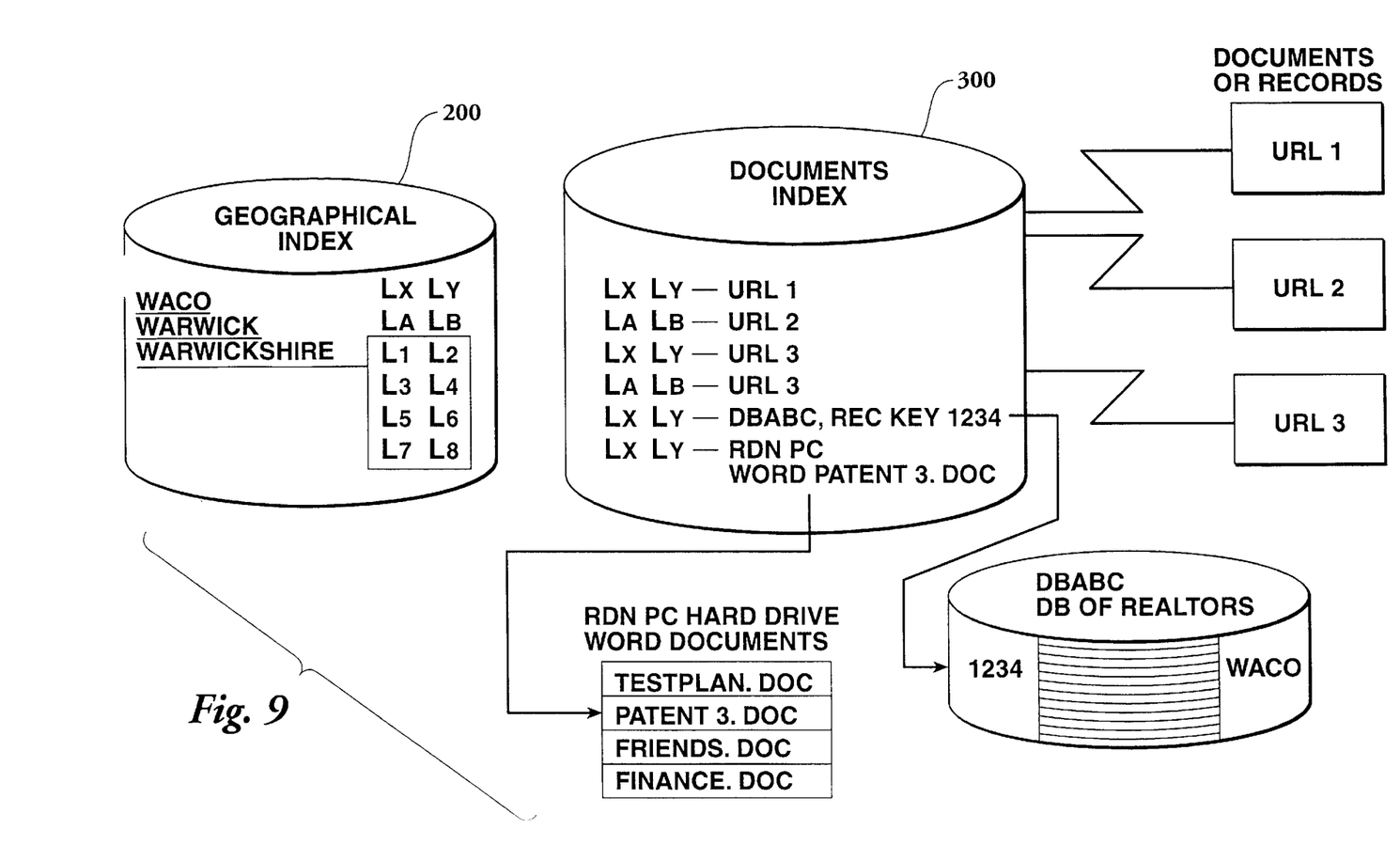
FIG. 9 is an illustration depicting the relationships between index structures of the present invention.

FIG. 9 illustrates the relationship among the indexes and documents. The Geographical Index 200 is a database containing a plurality of place name references, each reference having a corresponding set of geographical coordinates. The Document Index 300 is organized by sets of coordinates with a cross reference to a document, record or database. The Document Index 300 has the addresses of the source documents referred to so that they can be accessed and the locations of the source documents retrieved.

The present invention may be used in a wide variety of applications. In travel services, a user may want to access a hotel in a given locale, a restaurant within a specified distance from the hotel and other locations or services. Information on all of these references may be gathered and returned to the user.

Although the foregoing describes the present invention in detail, it is to be clearly understood that the same is to serve for purposes of illustration and example only and is not to be regarded in any manner as an expression of invention limitation, the spirit and scope of the present invention being limited exclusively by the claims appended hereto.

What is claimed is:

1. An information search and retrieval process using geographical coordinates, which process comprises:
    building an index of coordinates for a plurality of text based references, resources or sites, each having a set of said coordinates;
    accepting a user inquiry containing a text reference;
    converting said text reference specified in said user inquiry to a set of coordinates;
    searching against said index of coordinates based on the converted coordinates of said user inquiry reference; and
    returning all information retrieved from said searching in a text based format.

2. An information search and retrieval process as set forth in claim 1 wherein said references, resources or sites each refers to travel references, such as hotels.

3. An information search and retrieval process as set forth in claim 1 wherein said text based references, resources and sites are obtained from documents in a file.

4. An information search and retrieval process as set forth in claim 3 including a plurality of said files such as the World Wide Web.

5. An information search and retrieval process as set forth in claim 4 including the additional step of retrieving the location of said documents from those identified in said searching.

6. An information search and retrieval process as set forth in claim 1 wherein said index of coordinates comprise latitude and longitude coordinates.

7. An information search and retrieval process as set forth in claim 1 including the additional step of searching against the coordinates index based on proximity to said user inquiry set of coordinates.

8. An information search and retrieval process as set forth in claim 1 including the additional step of expanding the coordinates in the event that references are not returned from the initial searching.

9. An information search and retrieval process as set forth in claim 1 including the additional step of updating the coordinate index with additional documents.

10. An information search and retrieval process as set forth in claim 3 including the additional step of updating said index of coordinates with additional references, resources or sites.

11. An information search and retrieval process as set forth in claim 1 wherein said step of accepting a user inquiry and converting said text reference includes checking multiple entries for place names.

12. A geographical coordinates information search and retrieval system which comprises:
    an index of coordinates for a plurality of text based references, resources or sites, each having a set of said coordinates;
    means to accept a user inquiry containing a text reference;
    a set of coordinates for said user inquiry text reference converted from said text reference; and
    means to search against said coordinates index for said inquiry set of coordinates and to return information retrieved from said search.

13. A geographical coordinates information search and retrieval system as set forth in claim 12 wherein said text based references, resources or sites are obtained from documents in a file.

14. A geographical coordinates information search and retrieval system as set forth in claim 13 wherein said means to return information retrieved includes return of the location of said documents to said user.

15. A geographical coordinates information search and retrieval system which comprises:
    a plurality of documents from a source file or source files such as the world wide web;
    a geographical index containing text based references, resources or sites, each cross-referenced to a set of coordinates; and
    a document index categorized by said coordinates with cross references to said text based references, resources, or sites.

16. A geographical coordinates information search and retrieval system as set forth in claim 15 wherein said geographical index is stored on a database connected to a central processing unit.

* * * * *